UNITED STATES PATENT OFFICE.

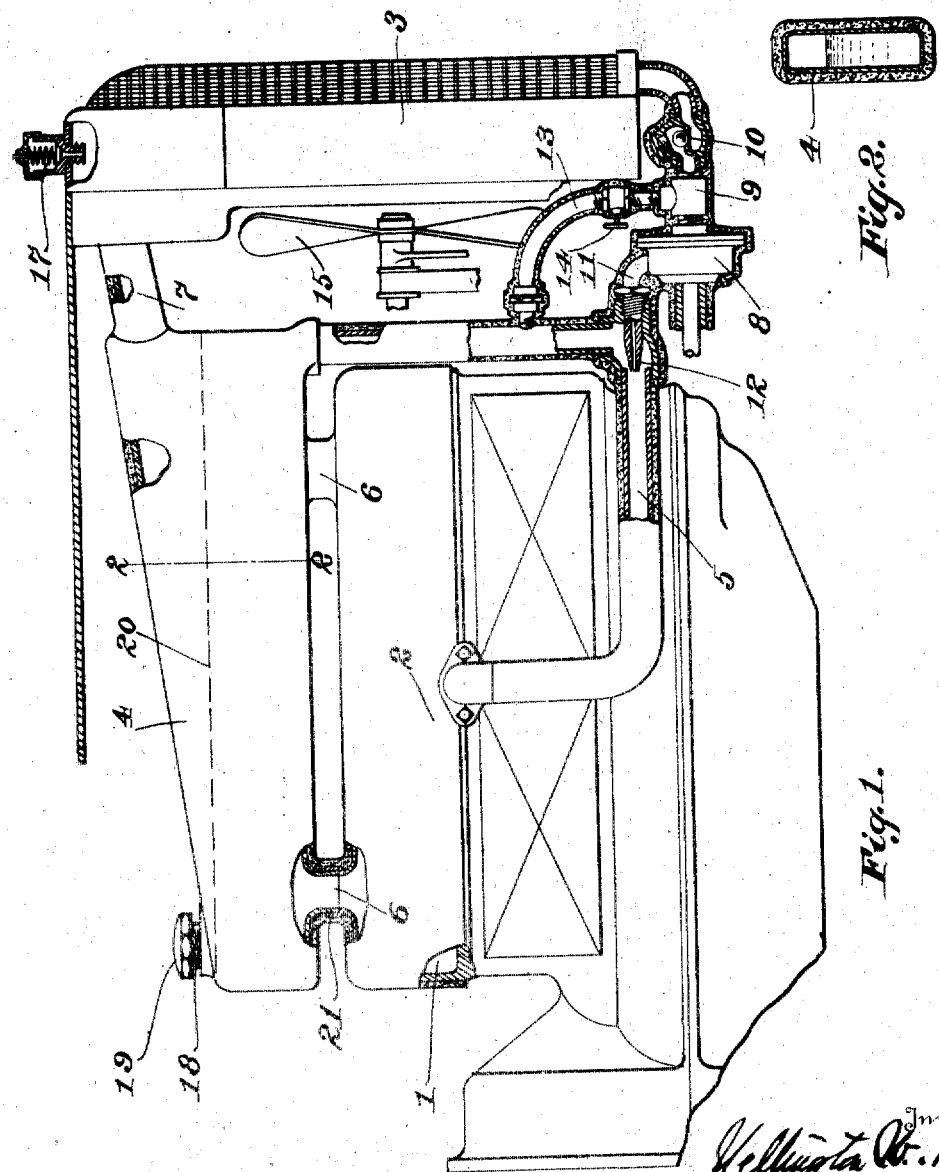

WELLINGTON W. MUIR, OF BALTIMORE, MARYLAND.

COOLING SYSTEM.

1,252,927.  Specification of Letters Patent.  Patented Jan. 8, 1918.

Application filed September 21, 1917. Serial No. 192,458.

*To all whom it may concern:*

Be it known that I, WELLINGTON W. MUIR, a citizen of the United States of America, residing in the city of Baltimore, State of Maryland, have invented certain new and useful Improvements in Cooling Systems, of which the following is a specification.

The difficulty of maintaining the cylinder walls of internal combustion engines at a temperature suitable to most efficient and economical operation is well understood. This difficulty is most important in connection with automobile engines. The majority of automobiles are operated through the entire twelve months and are subjected during the year to a variation of the temperature of the atmosphere, which is the cooling medium, ranging in the temperate zone through one hundred or more degrees Fahrenheit. Not only is there a very wide range of temperature and therefore of efficiency of the cooling medium but there is also a wide variation of the rate of heat generation in the engine as between running on a level or down hill, and hill climbing or operating in heavy soil.

The usual cooling system, consisting of a water jacket and a radiator with means for circulating the water through both, depends for its capacity on the speed of circulation and the difference in temperature between the water and the air so that to maintain any particular temperature of the water and hence of the cylinder walls with a given generation of heat, which latter in any particular engine depends on the amount of power generated, it is necessary with a given size radiator to have a constant temperature of the atmosphere. As this of course cannot be had, it is necessary again to make the radiator a compromise between the summer and winter requirements. Under these circumstances the system really reaches its maximum efficiency only a few times during the year, at the spring and fall temperatures.

Another condition which must be met and in the meeting of which a great reduction of efficiency at present takes place, is the loss of heat from the system while the engine is not running, requiring a corresponding expenditure of fuel and a period of inefficient operation while the water is approaching the temperature nearing maximum efficiency.

The object of the present invention is to provide a cooling system in which the temperature of maximum efficiency is maintained during the entire period of operation of the engine, substantially unaffected by the atmospheric temperature as it varies between the upper and lower extremities, the system being in addition to this so arranged that there is no circulation through the radiator and practically no loss of heat while the engine is not running.

To this end, I have revised the present so-called water cooled system, i. e., the common system in which water is the heat vehicle, the air being the cooling medium which takes the heat from the water. In my system, I divert the water circulation from the radiator, using the latter merely to condense the steam formed in the system, the resulting water of condensation being returned to the jacket. In order that there may be sufficient surplus water in the system in case of loss by leakage and the like, I have in the present instance provided a tank of about the same capacity as the available water space of the radiator in the old system, the idea being that the present radiators be retained and the connections altered to conform to my system. The suction of the pump is still connected to the bottom of the radiator. I preferably provide a non-return valve in the pipe to prevent back-flow of water from the jacket so that the water from the tank and jacket will not enter the radiator and become cooled when the engine is idle. This is particularly desirable in cold weather. The tank is connected to the top and bottom of the water jacket, and preferably there is an injector nozzle in the lower connection directed toward the water jacket and a by-pass around the nozzle and pump leading to the suction so that whatever the amount of water condensed, the pump is supplied with fluid and serves to circulate the water through the jackets. To regulate the capacity of the by-pass, it may have a suitable valve. The top of the tank is connected to the top of the radiator and the tank is preferably so arranged that it cannot be filled up to the level of this connection as by placing the filling cap below the level of such connection, thus preventing the water from being carried over into the radiator with the steam.

The normal operation is as follows:—The water in the system boils during normal running of the engine, practically the only loss of heat being by condensation; the steam is condensed in the radiator and the condensed water is returned to the jackets by the pump.

To prevent loss of heat from the system when the engine is not running, the tank, the water jackets and the pipes are, in the preferred form of the invention, given a protecting covering which may be of asbestos or an air or vacuum jacket. In this way all the heat may be retained in the system for there is no loss through the radiator after the generation of steam stops and the temperature of the water can to a considerable degree be retained after the principle of the thermos bottle even for several days at a time. This is of great assistance in starting and is a source of considerable saving of the gasolene which would under the old conditions be consumed in heating the system to a fairly efficient running temperature. This is particularly important in cold weather.

In the accompanying drawing I have illustrated an engine equipped with a cooling system constructed in accordance with my invention.

Figure 1 is a vertical central section; and

Fig. 2 is a cross section through the tank on the line 2, 2 of Fig. 1.

Referring to the drawings by numerals, the structure includes the usual cylinder casting 1, having a water jacket 2, a radiator 3 and above the cylinder casting, I have shown a tank 4 which, as at present advised, should be of volume equal to the internal capacity of the radiator. The tank 4, as shown, is connected by a pipe 5 to the bottom of the water jacket and the connections 6 from the top of the water jacket as shown lead to the bottom of the tank 4 though the arrangement and capacity of this tank may be varied within the scope of the invention. The tank 4 in fact takes the place of the water manifold used in the ordinary system and forms part of a continuous conduit connected to the top and bottom of the water jacket. As shown, the forward upper extremity of this conduit and of the tank is connected by a suitable pipe 7 to the top of the radiator.

My cooling system is adapted for use with a circulating pump which may be of the well-known centrifugal type, or other means for moving the water may be employed. As shown, the suction of the pump is connected to the bottom of the radiator by a pipe 9 containing a non-return valve 10 which prevents flow of the cooling water into the radiator and consequent loss of heat when the engine is idle. Leading from the delivery of the pump, I have shown a passage 11 terminating in a nozzle 12, which may be termed an injector nozzle. This is in the connection between the tank 4 and the water jacket and directed toward the latter. I have also provided a by-pass 13 around the pump and nozzle, connecting the water pipe or conduit between the nozzle and the tank 4 to the suction 9 between the pump and the valve 10. The by-pass 13 prevents the pump from running dry with consequent injury to the pump and also provides circulation even in the absence of a supply of condensed water from the radiator. I find it preferable to make the by-pass 13 of considerably less capacity than the pipe 5 and I may also provide in the pipe 13 a valve 14 for the purpose of regulating the capacity of this by-pass. I have shown the usual fan 15 in the rear of the radiator and in place of the radiator cap, I use a pressure regulating valve or low pressure safety valve 17.

As shown, the tank 4 has its top well inclined upward from the rear to the front, and the connection 7 leads from the uppermost peak of the front end to the top of the radiator. In the lower or rear part of the top wall, I have placed a filling opening 18 and cap 19 whereby it is made impossible to raise the level of the water in the tank above the connection 7, leaving an exposed water surface 20 in the tank providing for the free escape of steam to the radiator without permitting the cooling water to pass. The entire system, with the exception of the radiator, may, to prevent loss of heat when the engine is idle or excessive cooling in cold weather when the engine is running, be covered with non-conducting material 21 or jacketed in any suitable manner.

In the operation of the system, we will first consider that the engine is started with all the water cold. The water having been poured in at the opening 18, the radiator is empty, the flow from the bottom being restrained by the valve 10 and passage through the top connection being impossible due to the position of the connection 7 above the water level and above filling opening 18. When the engine is running in the absence of the passing of steam through the radiator for condensation, there is practically no escape of heat from the system and the temperature of the cooling water rises until it reaches the boiling point. The circulation is kept up by the pump drawing water through the by-pass 13 and injecting it into the pipe 5 in the direction of circulation. When the temperature of the water reaches boiling, steam is given off from the surface 20 of the tank and passes into the radiator. As soon as it comes in contact with the air-cooled surfaces of the radiator, the steam is condensed and passes in the form of water to the bottom of the radiator and into the pipe 9 whence it is drawn by the suction of the pump through the valve 10 and, mingling with the water from the by-pass 13, is returned to the pipe 5 assisting in the circulation as already described.

It is clear that very soon after starting the water will reach the boiling temperature, which is considered to be approximately the temperature of greatest efficiency and the highest temperature at which there is no danger, with reasonable lubrication, of injuring the metal surfaces, cylinder walls, bearings, etc., and as this temperature is the highest which can be reached in water at atmospheric pressure, there is, with the system described, no difficulty in keeping the temperature of the system constant and as the water cannot be blown out or lost and all heated surfaces must remain submerged, there is no danger of burning or destruction by overheating. The radiator ordinarily provided for cooling is amply sufficient to condense the steam generated but to guard against excess pressure and injury to the radiator due to generation under abnormal conditions of more heat than the radiator can take care of, I have provided the safety valve 17.

In observing the operation of the system, it is noted that when the pump is disconnected with the engine running, the pressure in the air or steam space is increased from one to two inches of water and the temperature rises several degrees above the boiling point at atmospheric pressure. When the pump is started after the system has been in this condition, it is noted that the pressure in the radiator and in the tank and connections over the water drops slightly below atmosphere and the temperature is reduced several degrees below the boiling point at atmosphere. When the pump is running the variations of temperature of the atmosphere have no perceptible effect on the system. Even by immersing the radiator in ice water, no important change is produced, showing that under all conditions which the applicant has had opportunity to observe, the radiator used in this way is sufficient to carry off the surplus heat and maintain the system at or slightly below the boiling point at atmospheric pressure. The presence of the vacuum operates as a safe guard to prevent absolutely an increase of temperature beyond what is favorable for efficient operation and safe as to the possibility of injuring the metallic surfaces.

It is well understood that the internal combustion engine is a heat engine and that the heat given out from the cooling system is in fact the lost or waste energy. By reducing this to the minimum and keeping the temperature of the engine constant so that the other factors, as carburization and the like, can be regulated to their highest degree of efficiency for this constant temperature, I have not only increased the possible fuel economy but the capacity in power generation of the engine.

By preventing the flow of the cooling water into the radiator and confining the operation of the radiator to the condensation of steam, I have to a large extent stopped the loss of heat, while the engine is idle, and this loss is not only a source of difficulty in starting but also of considerable waste of fuel in heating up the engine after starting in cold weather. This effect is increased by jacketing all parts but the radiator.

I have thus described my invention specifically and in detail in order that its nature and operation may be fully understood; however, the specific terms herein are used descriptively rather than in their limiting sense and the scope of the invention is defined in the claims:

I claim:

1. In a cooling system for internal combustion engines, a water jacket, a pump connected to the top and bottom of the water jacket, a radiator, means connecting the top of the radiator to the rest of the system above the water level, a connection from the bottom of the radiator to the suction of the pump, and means for preventing flow through said connection toward the radiator.

2. In a cooling system for internal combustion engines, a water jacket, a pump connected to the top and bottom of the water jacket, a radiator, means connecting the top of the radiator to the rest of the system above the water level, a connection from the bottom of the radiator to the suction of the pump, means for preventing flow through said connection toward the radiator, and a by-pass from the suction to the delivery of the pump.

3. In a cooling system for internal combustion engines, a water jacket, a pump connected to the top and bottom of the water jacket, a radiator, means connecting the top of the radiator to the rest of the system above the water level, a connection from the bottom of the radiator to the suction of the pump, means for preventing flow through said connection toward the radiator, and a safety valve in the top of the radiator.

4. In a cooling system for internal combustion engines, a water jacket, a pump connected to the top and bottom of the water jacket, a radiator, means connecting the top of the radiator to the rest of the system above the water level, a connection from the bottom of the radiator to the suction of the pump, means for preventing flow through said connection toward the radiator, and a filling opening in the system below the top radiator connection.

5. In a cooling system for internal combustion engines, a water jacket, a pipe connected to the top and bottom of the water jacket, a radiator, means connecting the pipe to the top of the radiator above the level of liquid in the system, a connection from the bottom of the radiator to the first-mentioned pipe, a non-return valve in said connection, and means for setting up the flow from the bottom of the radiator toward the bottom of the water jacket.

6. In a cooling system for internal combustion engines, a water jacket, a pipe connected to the top and bottom of the water jacket, a radiator, means connecting the pipe to the top of the radiator above the level of liquid in the system, a connection from the bottom of the radiator to the first-mentioned pipe, a non-return valve in said connection, means for setting up the flow from the bottom of the radiator toward the bottom of the water jacket, and a filling opening below the top radiator connection.

7. In a cooling system for internal combustion engines, a water jacket, a pipe connected to the top and bottom of the water jacket, a radiator, means connecting the pipe to the top of the radiator above the level of liquid in the system, a connection from the bottom of the radiator to the first-mentioned pipe, a non-return valve in said connection, means for setting up the flow from the bottom of the radiator toward the bottom of the water jacket, and a safety valve in the top of the radiator.

8. In a cooling system for internal combustion engines, a water jacket, a pipe connected to the top and bottom of the water jacket, a radiator, means connecting the pipe to the top of the radiator above the level of the liquid in the system, a connection from the bottom of the radiator to the first-mentioned pipe, a non-return valve in said connection, means for setting up the flow from the bottom of the radiator toward the bottom of the water jacket, and a by-pass around said means.

9. In a cooling system for internal combustion engines, a water jacket, means for maintaining a continuous circulation of water through said jacket, a radiator connected at the top to the water jacket above the level of the water in the jacket, a connection from the bottom of the radiator to the water jacket, a non-return valve in said connection, and means for drawing water from the bottom of the radiator and forcing it into the jacket so that the radiator contains only steam and the water in the jacket is maintained at boiling.

10. In a cooling system for internal combustion engines, a water jacket, a conduit connecting the top and bottom of the water jacket, a pump with its delivery in said conduit, the discharge being directed toward the lower portion of the water jacket, a radiator having its top connected to said conduit above the water level, and a connection from the bottom of the radiator to the pump, the operation of the pump in connection with the system serving to create a slight vacuum over the water and in the radiator whereby the temperature of the system is maintained slightly below the boiling point at atmospheric pressure.

11. In a cooling system for internal combustion engines, a water jacket, a conduit connecting the top and bottom of the water jacket, a reservoir included therein, a pump with its delivery in said conduit and directed toward the lower portion of the water jacket, a radiator having its top connected to said conduit above the water level, a connection from the bottom of the radiator to the suction of the pump, and a non-return valve in said connection.

12. In a cooling system for internal combustion engines, a water jacket, a conduit connecting the top and bottom of the water jacket, a reservoir included therein, a pump with its delivery in said conduit and directed toward the lower portion of the water jacket, a radiator having its top connected to said conduit above the water level, a connection from the bottom of the radiator to the suction of the pump, and a filling cap below the water level in the conduit.

13. In a cooling system for internal combustion engines, a water jacket, a conduit connecting the top and bottom of the water jacket, a reservoir included therein, a pump with its delivery in said conduit and directed toward the lower portion of the water jacket, a radiator having its top connected to said conduit above the water level, a connection from the bottom of the radiator to the suction of the pump, and a by-pass leading from the conduit above the pump delivery to the suction of the pump between the pump and the non-return valve.

14. In a cooling system for internal combustion engines, a water jacket, a conduit connected to the top and bottom of the water jacket, a connection from the radiator to the conduit above the water level in the conduit, a connection from the bottom of the radiator to the conduit, means for drawing water from the bottom of the radiator and discharging it into the conduit.

15. In a cooling system for internal combustion engines, a water jacket, a conduit connected to the top and bottom of the water jacket, a connection from the radiator to the conduit above the water level in the conduit, a connection from the bottom of the radiator to the conduit, means for drawing water from the bottom of the radiator and discharging it into the conduit, and a non-return valve therein.

16. In a cooling system for internal combustion engines, a water jacket, a conduit connected to the top and bottom of the water jacket, a connection from the radiator to the conduit above the water level in the conduit, a connection from the bottom of the radiator to the conduit, means for drawing water from the bottom of the radiator and discharging it into the conduit, and a by-pass around said means.

17. In a cooling system for internal combustion engines, a water jacket, a pump connected to the top and bottom of the water jacket, a radiator, means connecting the top of the radiator to the rest of the system above the water level, and connection from the bottom of the radiator to the suction of the pump.

Signed by me at Baltimore, Maryland, this 19th day of September, 1917.

WELLINGTON W. MUIR.

Witnesses:
ZELLA KUHN,
ALICE G. DONEGAN.